No. 779,542. Patented January 10, 1905.

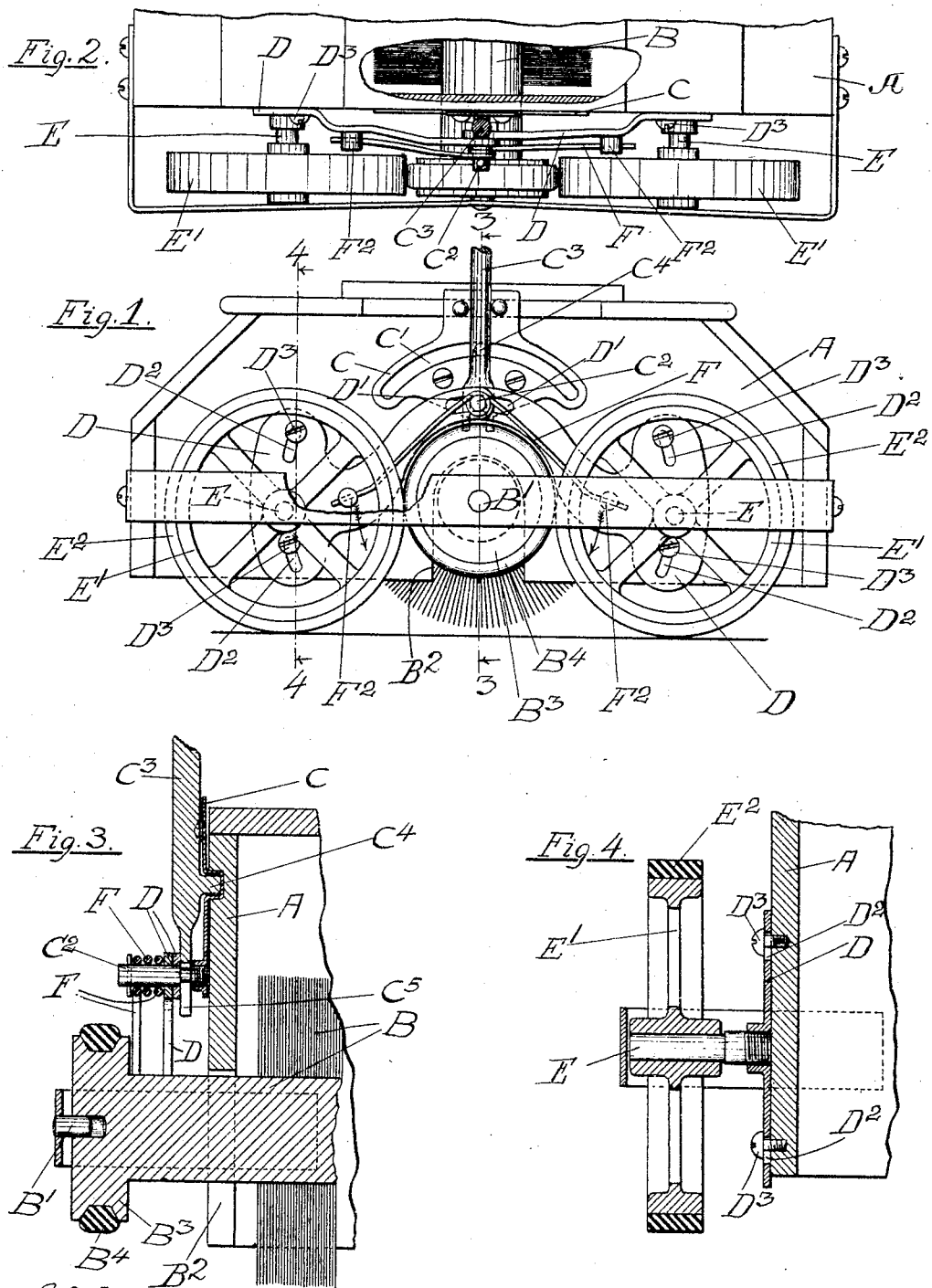

UNITED STATES PATENT OFFICE.

WALTER D. HODSON, OF MARION, INDIANA, ASSIGNOR TO PHILIP MATTER AND BENJAMIN F. BURK, COPARTNERS DOING BUSINESS UNDER THE FIRM NAME OF NATIONAL SWEEPER COMPANY, OF MARION, INDIANA.

CARPET-SWEEPER.

SPECIFICATION forming part of Letters Patent No. 779,542, dated January 10, 1905.

Application filed February 10, 1904. Serial No. 192,871.

*To all whom it may concern:*

Be it known that I, WALTER D. HODSON, a citizen of the United States, residing at Marion, in the county of Grant and State of Indiana, have invented a certain new and useful Improvement in Carpet-Sweepers, of which the following is a specification.

My invention relates to carpet-sweepers, and has for its object to provide certain new and useful improvements hereinafter more fully set out.

One form of my invention or one device containing my invention is illustrated in the accompanying drawings, wherein—

Figure 1 is a view of carpet-sweeper containing my improvement; Fig. 2, a plan view of one end with parts broken away; Fig. 3, a cross-section on the line 3 3 of Fig. 1; Fig. 4, a cross-section on the line 4 4 of Fig. 1.

Like parts are indicated by the same letter in all the figures.

A is the case of the carpet-sweeper; B, the sweeping brush-roll. This brush-roll is supported on the stud, the end of which is indicated at B', and it passes through the slot $B^2$ in the end of the case in the usual manner. On its outer extremity is mounted the wheel $B^3$, with the rubber tire $B^4$. To each end of the case is attached the plate C, having the arc-like slot C' and the pin $C^2$.

$C^3$ is one end of handle-bail, provided with the pin $C^4$ to engage the slot C' and provided with the slot $C^5$ to engage the pin $C^2$.

D D are wheel supports or plates, each slotted at D' to engage the pin $C^2$ and slotted at $D^2 D^2$ to receive the screws $D^3 D^3$, which screws are made fast to the end of the case. Each plate D carries an outwardly-projecting pin E, on which is mounted the supporting-wheel E'. This wheel has the elastic tire $E^2$, which engages the tire $B^4$ on the wheel $B^3$. There is one of these wheels and wheel-supports and associated parts on each side of the brush-roll at each end of the case; but the wheels at one end of the case have no connection with those at the other. I dispense with the use of the axles.

F is a spring, preferably looped around the pin $C^2$ and having two arms. Each arm passes freely through an aperture in the pin $F^2$, which is mounted on the plate D. This spring tends at all times to force the wheels E' somewhat in the direction indicated by the arrows in Fig. 1. Each wheel is free to have a certain amount of motion vertically or approximately vertically; but each is kept always in contact with the wheel $B^3$. The wheels E' are not free to move away from the wheel $B^3$.

I have shown these several parts as above suggested in a diagrammatic way—that is, without any effort to exhibit their exact proportions or relations and without attempting to show all of the parts which might be deemed necessary or important in actual operation.

The use and operation of my invention are sufficiently illustrated by what has preceded. When pressure is applied to the case, the supporting-wheels will give upwardly slightly, because of the loose connection which they have with the case, and when the pressure is released the spring will force them downwardly, and thus the broom action of the sweeper-roll is secured. The plate D, connected to the case at three places, is securely held in position, and yet since these connections contain each a slot the motion permitted to the plate D is such as to keep it in proper relation to the wheels. The arrangement of the slots and connections can of course be varied. As shown in the drawings, the slots $D^2 D^2$ are concentric with the axle of the sweeper-roll. The two wheels on each end of the case work together, because they are associated with two branches of one and the same spring.

I claim—

In a carpet-sweeper, the combination of a brush-roll, a wheel on the end thereof, supporting-wheels mounted each on a movable plate, said movable plate being connected with the case at three points, one of such connections comprising a pin on the sweeper-case and a curved slot on the plate concentric with the brush-roll, and a spring which tends to force the supporting-wheels downwardly.

WALTER D. HODSON.

Witnesses:
H. L. CUSHWA,
NORA E. CONGDON.